Dec. 7, 1937.   O. E. PENSBEE   2,101,594
VARIABLE SPEED PULLEY
Filed June 19, 1936
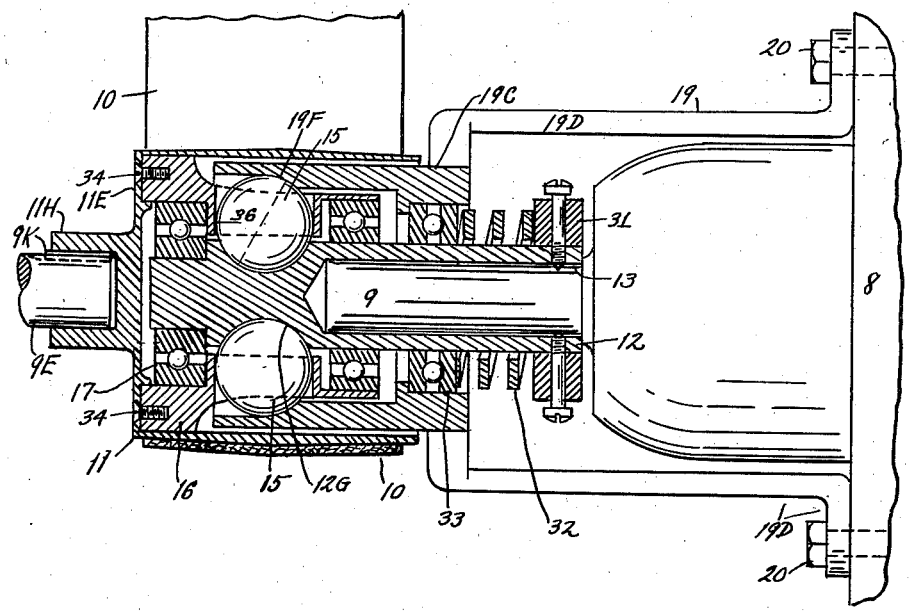
INVENTOR:
Otis Edward Pensbee
BY David E. Carlsen
ATTORNEY.

Patented Dec. 7, 1937

2,101,594

UNITED STATES PATENT OFFICE 2,101,594

VARIABLE SPEED PULLEY

Otis Edward Pensbee, St. Paul, Minn., assignor of one-half to Samuel Meckler, St. Paul, Minn.

Application June 19, 1936, Serial No. 86,103

2 Claims. (Cl. 74—302)

My invention relates to a variable speed device adaptable for mounting on any drive shaft such as the armature shaft of an electric motor. In various designs of my device from one to any desired number of pulley speed reductions are attainable. This device is particularly useful on electric motors used as the source of power for countershafts and line shafts on and from which reduced speeds lower than the motor speed is required. The object of my invention is to provide means for pulley speed reduction in a compact and simple and effective mechanism housed mainly within the drive pulley and easily manipulated to provide any predetermined and selective speed as may be required for various kinds of work.

The construction of my device is illustrated in its preferred form but subject to considerable variation in proportions and details according to available motor power and pulley speed requirements, all as herein fully described reference being had to the accompanying drawing, in which:—

The figure is a longitudinal sectional view disclosing a construction designed to produce a single pulley speed lower than the motor speed.

Referring to the drawing by reference numerals, 8 designates an electric motor of which 9 is the armature shaft.

10 designates a belt driven by a pulley 11 mounted on shaft 9. In my device the pulley is of cylindrical form closed at or near its outer end, as 11E.

19D comprises integral legs removably secured as with bolts 20 to the outer face of the motor 8 from which the armature shaft 9 protrudes.

It will be understood that this is a self contained pulley speed reduction device designed for one certain pulley speed lower than the drive shaft speed.

8 designates an electric motor from which extends the armature shaft 9 hereinafter designated the drive shaft. 19 is a spider or skeleton frame concentric of the drive shaft and fixed to the motor as at 20, its outer part comprising a horizontally directed cylinder 19C extending beyond the end of the drive shaft. The outer end of said cylinder comprises, interiorly, a circular outer ball race the face of which is designated 19F having traction contact on the outer parts of a row of balls 15. Said balls are each retained in a radially open pocket of a ball retainer 16 which in turn is retained at 34 to the outer end web 11E of pulley 11 rotatable concentrically over the stationary cylinder 19C.

12 is a drive shaft extension member, bored and keyed as at 13 to the drive shaft 9, and in its extended part outward of the end of shaft 9 is formed with an inner ball race groove 12G.

33 is a ball thrust bearing retained in a bore in the inner part of the cylinder 19C and on extension shafts 12 and 17 is a like bearing on the outer extremity of shaft 12 retaining it concentric of and in the outer part of the ball-pocket member 16 (inside of the end web 11E of the pulley).

It will now be readily understood that the balls 15 are regularly spaced in their respective pockets and contacted interiorly on a relatively small diameter by groove 12G on a plane outwardly of the centers of the balls, while the outer faces of said balls are contacted on a large diameter against face 19F of cylinder 19C on a plane inwardly of the ball centers. In other words the balls are rotated on an angular plane designated by a dotted diametrical line in the upper ball 15.

To provide an inward pressure causing and maintaining said contacts of the balls and their rotation on the angular plane I provide a compression coil spring 32 about shaft 12 between bearing 13 and a collar 31 fixed on the inner end of said shaft 12.

The inward continuous pressure thus produced rolls the balls on the angular plane described the rolling contact of the drive shaft race and contact of the outer parts of the balls in the stationary race producing at the centers of the balls a reduced linear speed at the centers of the balls and transmitted to the ball container and the pulley.

As an illustration of the simple and effective speed reduction of this self contained device let it be assumed that the drive shaft 9—12 rotates at 1800 R. P. M. and a pulley speed of 300 R. P. M. is required.

Initially there is a pulley speed reduction through the balls 15 of two to one, if the diametrical pressure on the balls were horizontally through the balls and parallel to the drive shaft. The inner contact of the balls (by inner race) may be assumed to be on a circle of one inch diameter and the outer race contact (with stationary cone) on a circle of three inch diameter making a reduction of three to one multiplied by the initial reduction of 2–1, or in all a reduction of 6 to 1 on a circle through the centers of the balls where rotation is imparted to the ball retainer and pulley. Thus the pulley will rotate at one sixth the speed of the drive shaft or 300 R. P. M.

A feature of my device is its compact or self-contained construction, mainly within the pulley, only the spider and cylinder 19D, 19C, the ball retainer and the extension shaft and inner cone being of special construction and designed in proportions easily calculated for speed reduction required.

The pulley 11 is shown formed with an extension hub 11H bored and provided with a keyway to retain an extension shaft 9E with a key 9K, said shaft being in alinement with shaft 9 and any of the forms of the device thus becomes a highly useful speed reduction coupling. It will be readily understood that shaft 9E may be of any suitable length and carry other pulleys, drive sprockets or gears.

I claim:

1. A single-speed reducing device for motor drive shafts, said device comprising a stationary outer ball race member mounted on said motor concentric of its drive shaft and its ball race positioned outwardly of the end of the said drive shaft, a drive-shaft extension member with a sleeve part fixed on the drive shaft, a ball retainer rotatably carried by said extension member, a pulley carried by said ball retainer and extending over the stationary ball race member, an inner ball race at the outer part of said extension shaft and rotating in a plane outward of the stationary ball race, said ball retainer formed with a series of circularly arranged ball carrying and radially open pockets, a ball in each pocket exposed inwardly and outwardly of its pocket and contacting the said inner and outer races, said stationary ball race contacting the balls in a plane inward of the plane of ball contact of the inner race, to roll the balls simultaneously, all said balls rotatable on a common angular plane to rotate the ball carrier by friction contact on a circle intermediate the ball races within the pockets and produce a predetermined pulley speed lower than the drive shaft speed, and means for continuously and yieldably compressing the balls into traction contact with the races.

2. The structure specified in claim 1, in which said compression means comprises a collar on the sleeve end of the extension shaft, a compression coil spring about the extension shaft sleeve and under compression between said collar and the adjacent inner part of the stationary ball race member and having rotary contact with the latter.

OTIS EDWARD PENSBEE.